(12) United States Patent
Leuenberger et al.

(10) Patent No.: US 7,667,995 B1
(45) Date of Patent: Feb. 23, 2010

(54) TELEPORTATION SYSTEM FOR ELECTRONIC MANY-QUBIT STATES USING INDIVIDUAL PHOTONS

(75) Inventors: Michael N. Leuenberger, Oviedo, FL (US); Michael E. Flatté, Iowa City, IA (US); David D. Awschalom, Santa Barbara, CA (US)

(73) Assignees: University of Iowa Research Foundation, Iowa City, IA (US); The Regents of the University of California, Oakland, CA (US)

( * ) Notice: Subject to any disclaimer, the term of this patent is extended or adjusted under 35 U.S.C. 154(b) by 346 days.

(21) Appl. No.: 11/352,387

(22) Filed: Feb. 9, 2006

Related U.S. Application Data

(60) Provisional application No. 60/651,151, filed on Feb. 9, 2005.

(51) Int. Cl.
*G11C 13/00* (2006.01)

(52) U.S. Cl. .................. 365/106; 977/708; 977/933; 398/40; 398/158

(58) Field of Classification Search ............... 365/106, 365/200; 257/13, 31, 97, 202, E29.071, E29.168, 257/E49.003; 398/140, 175, 40; 977/708, 977/933; 250/214.1, 251, 493.1; 324/207.2, 324/248, 307; 359/107, 108, 577; 380/201, 380/256, 263

See application file for complete search history.

(56) References Cited

U.S. PATENT DOCUMENTS

2004/0042715 A1* 3/2004 Linden et al. ............. 385/31

2004/0071019 A1* 4/2004 Magnus et al. ............. 365/200
2004/0264958 A1* 12/2004 Zoller et al. ............... 398/40
2005/0131746 A1* 6/2005 Beausoleil et al. ........... 705/7

OTHER PUBLICATIONS

Armani et al., "Ultra-high-Q toroid microcavity o a chip," Nature 421: p. 925-928, 2003.
Auston and Nuss, "Electrooptic Generation and Detection of Femtosecond Electrical Transients," *IEEE J. Quant. Electron.* 24: p. 184-197, 1988.
Barrett et al., "Deterministic quantum teleportation of atomic qubits," *Nature* 429: p. 737-739, 2004.
Becker et al., "Picosecond Fluorescence Lifetime Microscopy by TCSPC Imaging" Proc. SPIE 4262, 414-419 (2001).
Bennett et al., "Quantum information and computation," *Nature* 404: p. 247-255, 2000.
Bennett et al., "Teleporting an Unknown Quantum State via Dual classical and Einstein-Posolsky-Rosen Channels," *Phys. Rev. Lett.* 70: p. 1895-1899, 1993.
Bouwmeester et al., "Experimental quantum teleportation," *Nature* 390: p. 575-579, 1997.

(Continued)

*Primary Examiner*—Son Dinh
*Assistant Examiner*—Harry W Byrne
(74) *Attorney, Agent, or Firm*—Ballard Spahr LLP

(57) ABSTRACT

A method for creating a logic state for teleporting quantum information using a single photon is described. The method includes receiving a photon with an initial polarization and causing a first semiconductor crystal to have a first spin orientation. The photon interacts with the first semiconductor crystal for producing a resulting polarization dependent upon the first spin orientation. Causing the photon to interact with the first semiconductor crystal generates a maximally entangled state.

6 Claims, 3 Drawing Sheets

OTHER PUBLICATIONS

Braunstein et al., "Maximal violation of Bell Inequalities for Mixed States," *Phys. Rev. Lett.* 68: p. 3259-3261, 1992.

Einstein et al., "Can Quantum-Mechanical Description of Physical Reality Be Considered Complete?" *Phys. Rev.* 47: p. 777-780, 1935.

Fang et al., "Probabilistic teleportation of a three-particle state via three pairs of entangled particles," *Phys. Rev.* A 67: p. 014305-1-014305-4, 2003.

Friesen et al., "Spin Readout and Initialization in a Semiconductor Quantum Dot," *Phys. Rev. Lett.* vol. 92, No. 3: p. 037901-1-037901-4, 2004.

Greenberger et al., "Going Beyond Bell's Theorem" Bell's Theorem, Quantum Theory, and Conceptions of the Universe, 69-72 (Kluwer Academic, Dordrecht, 1989).

Guest et al., Measurement of optical absorption by a single quantum dot exciton, Phys. Rev. B, 65: p. 241310-1-241310-4, 2002.

Gurioll et al., Non-linear resonant Rayleigh scattering from microcavity, Physica E 17: p. 463-464, 2003.

Jennewein et al., "Experimental Nonlocality Proof of Quantum Teleportation and Entanglement Swapping," *Phys. Rev. Lett.* 88: p. 017903-1-017903-4, 2001.

Kikkwawa and Awschalom, "Resonant Spin Amplification in n-Type GaAs," Phys. Rev. Lett. 80: p. 4313-4316, 1998.

Kroutvar et al., "Optical programmable electron spin memory using semiconductor quantum dots," *Nature* 432: p. 81-84, 2004.

Lee, J., "Multipartite entanglement for entanglement teleportation," *Phys. Rev.* A 66: p. 052318-1-052318-5, 2002.

Loss and DiVincenzo, "Quantum computation with quantum dots," *Phys. Rev. A* 57: p. 120-126, 1998.

Marcikic et al., "Long-distance teleportation of qubits at telecommunication wavelengths," *Nature* 421: p. 509-513, 2003.

Michler et al., "Laser emission from quantum dots in microdisk structures," *Appl. Phys. Lett.* 77: p. 184-186, 2000.

Qi et al., "A three-dimensional optical photonic crystal with designed point defects," *Nature* 429: 538-542, 2004.

Rahachou et al., "Effects of boundary roughness on a Q factor of whispering-gallery-mode Ising microdisk cavities," *Appl. Phys.* 94: p. 7929-7931, 2003.

Riebe et al., "Deterministic quantum teleportation with atoms," *Nature* 429: p. 734-737, 2004.

Roa et al., "Optimal conclusive teleportation of quantum," *Phys. Rev.* A 68: p. 022310-1-022310-6, 2003.

Srinivasan et al., "Experimental demonstration of a high quality factor photonic crystal microcavity," *Appl. Phys. Lett.* 83: p. 1915-1917, 2003.

Wootters and Zurek, "A single quantum cannot be cloned," *Nature* 299: p. 802-803, 1982.

* cited by examiner

US 7,667,995 B1

TELEPORTATION SYSTEM FOR ELECTRONIC MANY-QUBIT STATES USING INDIVIDUAL PHOTONS

CROSS REFERENCE TO RELATED APPLICATIONS

This application claims priority to a U.S. Provisional Patent Application with application No. 60/651,151 entitled "TELEPORTATION OF ELECTRONIC MANY-QUBIT STATES VIA SINGLE PHOTONS," which was filed on Feb. 9, 2005. This application is hereby incorporated by reference in its entirety.

DESCRIPTION OF RELATED ART

Transport, or transportation, is the movement of people, goods, signals and information. The field of transport has several aspects, which include infrastructure, vehicles, and operations. Infrastructure includes transport networks (e.g., roads, railways, airways, canals, and pipelines, etc.), as well as the nodes, or terminals, (e.g., airports, railway stations, bus stations and seaports). The vehicles (e.g., automobiles, bicycles, buses, trains, airplanes) generally ride on the networks. Operations involve the control of the system (e.g., traffic signals, ramp meters, railroad switches, and air traffic control).

At the level of a particle (e.g., electron, photon, atom, etc.), there are two approaches to transporting that particle from one place to another. The first is very similar to the approaches described above, in which that particle is phyically moved from one place to another. The second, called teleportation, is when the complete quantum-mechanical state of one particle (an origin particle) is imprinted onto a second (a destination particle) at a different location. The two particles involved do not move themselves, so teleportation does not use the same infrastructure, vehicles, and operations used in transportation. The complete quantum mechanical state (often referred to as the wave function of the particle) fully describes the physical properties of the particle. Usually in order to perform teleportation the destination particle is first prepared in a known quantum mechanical state. Because complete quantum-mechanical states cannot be fully measured, it is important that this process be possible without knowledge of the actual quantum mechanical state the origin particle is in. For the same reason once teleportation is complete the origin particle is left in a state unrelated to its initial (before teleportation) quantum mechanical state. The process is accompanied by the sending of some classical information from origin to destination. This information is insufficient to fully create the quantum mechanical state, but is sufficient to correct potential errors that occur during the teleportation process. Amidst the growing technological evolution, there remains a continued need in the development of technological devices that use teleportation.

Figure 1:
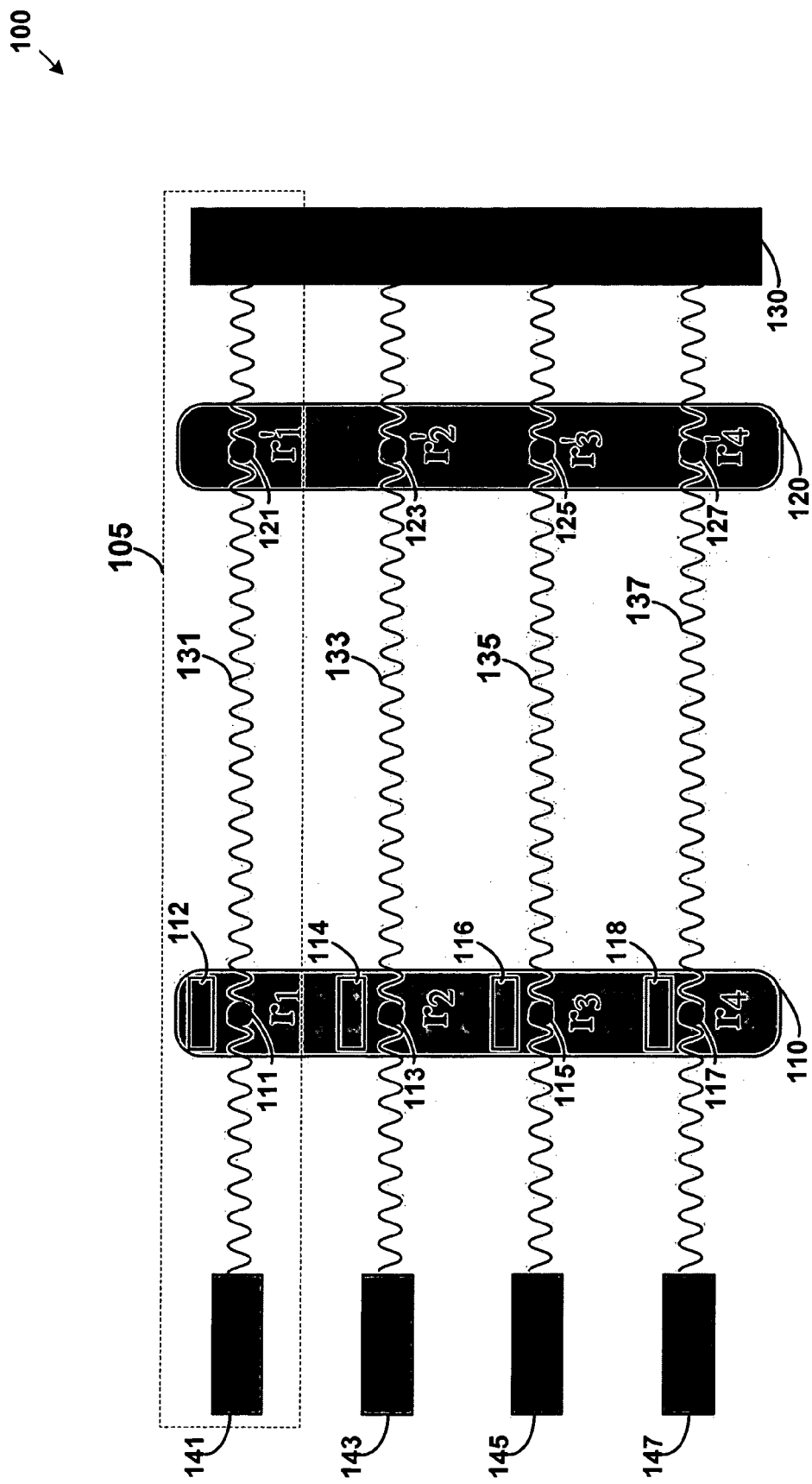
FIG. 1 is a block diagram of teleportation system for electronic many-qubit states using individual photons.

While the invention is susceptible to various modifications and alternative forms, specific embodiments have been shown by way of example in the drawings and subsequently are described in detail. It should be understood, however, that the description herein of specific embodiments is not intended to limit the invention to the particular forms disclosed. In contrast, the intention is to cover all modifications, equivalents, and alternatives falling within the spirit and scope of the invention as defined by the appended claims.

DETAILED DESCRIPTION OF EMBODIMENTS

Turning now to FIG. 1, this figure is a block diagram of teleportation system for electronic many-qubit states using individual photons 100. An origin quantum dot system 110 includes four quantum dots numbered 111, 113, 115, and 117 and respectively labeled $r_1$, $r_2$, $r_3$, and $r_4$. Each quantum dot contains a single electron in the lowest-energy conduction state, and the state of that quantum dot is fully described by the orientation of the spin of that electron. It is those electrons that can be teleported. With the teleportation system 100, information associated with the quantum dots 111-117 in the quantum dot system 110 can be transported to a destination quantum dot system 120. When the information associated with the quantum dots 111-117 is teleported, information is now associated with quantum dots 121-127, respectively labeled $r_1'$, $r_2'$, $r_3'$, and $r_4'$ result. If there are four quantum dots in the quantum dot system 110, then there are four quantum dots in quantum dot system 120, such that each quantum dot in the quantum dot system 120 was teleported from the quantum dot system 110. Alternatively, the number of quantum dot system 110 can be 3, 7, 20, or some other suitable number. Each quantum dot $r_j$ (e.g., $r_3$ or quantum dot 113) within the quantum dot system 110 represents a single qubit. Thus, this quantum dot system is a multi-qubit system with many qubit states (the state of the electron in each quantum dot); each qubit state is represented by a different qubit.

The origin quantum dot system 110 also includes four single spin detectors numbered 112, 114, 116, and 118 associated with each quantum dot. As the number of quantum dots in the system 110 varies, the number of detectors can also vary so that a one to one ratio remains for the number of quantum dots to the number of detectors. A single spin detector is a device that can record a spin, or intrinsic angular momentum of the conduction electron in a particular quantum dot along a particular axis (in this case perpendicular to the photon propagation direction in FIG. 1. For example, the single spin detector can be a single-electron transistor (SET), or the nucleation of ferromagnetic materials can be used as a mechanism for the single spin detector, or the transport across the quantum dot measured by two leads in a magnetic field can be used for the single spin detector, or the interaction of a photon (as described below) with the spin, and the measurement of the photon polarization, can be used for the single-spin detector. For example, the quantum detector 112 can record a spin associated with the quantum dot 111. Similarly, the quantum detector 116 can record a spin associated with the quantum dot 115. Since there is a spin detector associated with each quantum dot in the quantum dot system 110, the spin of the lowest conduction electron for each quantum dot can be individually determined along the axis perpendicular to the photon propagation in FIG. 1. As the spin of the lowest conduction electron for each quantum dot fully determines the quantum-mechanical state of that quantum dot, measurement of the spin along one axis provides a small amount of information about the state of that quantum dot. This information can be used to correct potential errors in imprinting the origin quantum state onto the destination in the teleportation process.

As clearly illustrated in FIG. 1, each quantum dot in the quantum dot system 110 also has an associated photon. A photon is a quantum of electromagnetic energy, regarded as a discrete particle having zero mass, no electric charge, and an indefinitely long lifetime. A single-photon source 130 can produce these photons. Examples of the single photon source can include a highly attenuated laser beam, or a laser beam passing through an extremely small aperture that permits one photon to pass per laser pulse, or some other suitable photon source. Photons 131, 133, 135, and 137 are associated with origin quantum dots 111, 113, 115, and 117, respectively. These photons are also associated with destination quantum dots 121, 123, 125, and 127, respectively. Therefore, each quantum dot $r_j$ in the quantum dot system 110 is connected to an associated quantum dot $r_j'$ in the quantum dot system 120 through a single photon. To accomplish this, quantum dots of different sizes can be used, where each pair of dots at $r_j$ and $r_j'$ have the same size. For example, the quantum dot 111 can be the same size as the quantum dot 121. Then these pair of quantum dots can be connected by the photon 131 with a proper resonant frequency. In an alternative implementation, an individual piece of optical fiber can connect corresponding quantum states (e.g., quantum dot 111 and quantum dot 121). An optical fiber is a device which efficiently transmits light from one end of the fiber to the other end. When one end is placed very close to the emitting region of the microcavity containing quantum dot 121, and parallel to the direction the photon can propagate in free space, then the single photon can enter into the fiber with a nearly 100% probability. When the other end is placed very close to the quantum dot 111, then the photon can enter the microcavity containing quantum dot 111 with nearly 100% probability.

The teleportation system 100 also includes a second quantum dot system 120 that serves as the destination where the quantum dots in system 110 are teleported. Since the destination quantum dot system 120 includes only the quantum dots whose electron spin orientations have been teleported from the quantum dot system 110, the number of quantum dots in this destination system can equal the number of quantum dots in the quantum dot system 110.

Finally, the teleportation system 100 also includes numerous photon detectors. The number of photon detectors can be 4, 9, 2, or some other suitable number. In one implementation, the teleportation system 110 can include a photon detector for each quantum state present in the quantum dot system 110. For example, the teleportation system 100 actually includes quantum detectors 141, 143, 145, and 147 associated with the quantum dots 111, 113, 115, and 117. The photon detectors can be a photomultiplier tube, avalanche diode, or some other suitable detector that can record a polarization associated with the detected photon.

Figure 2:
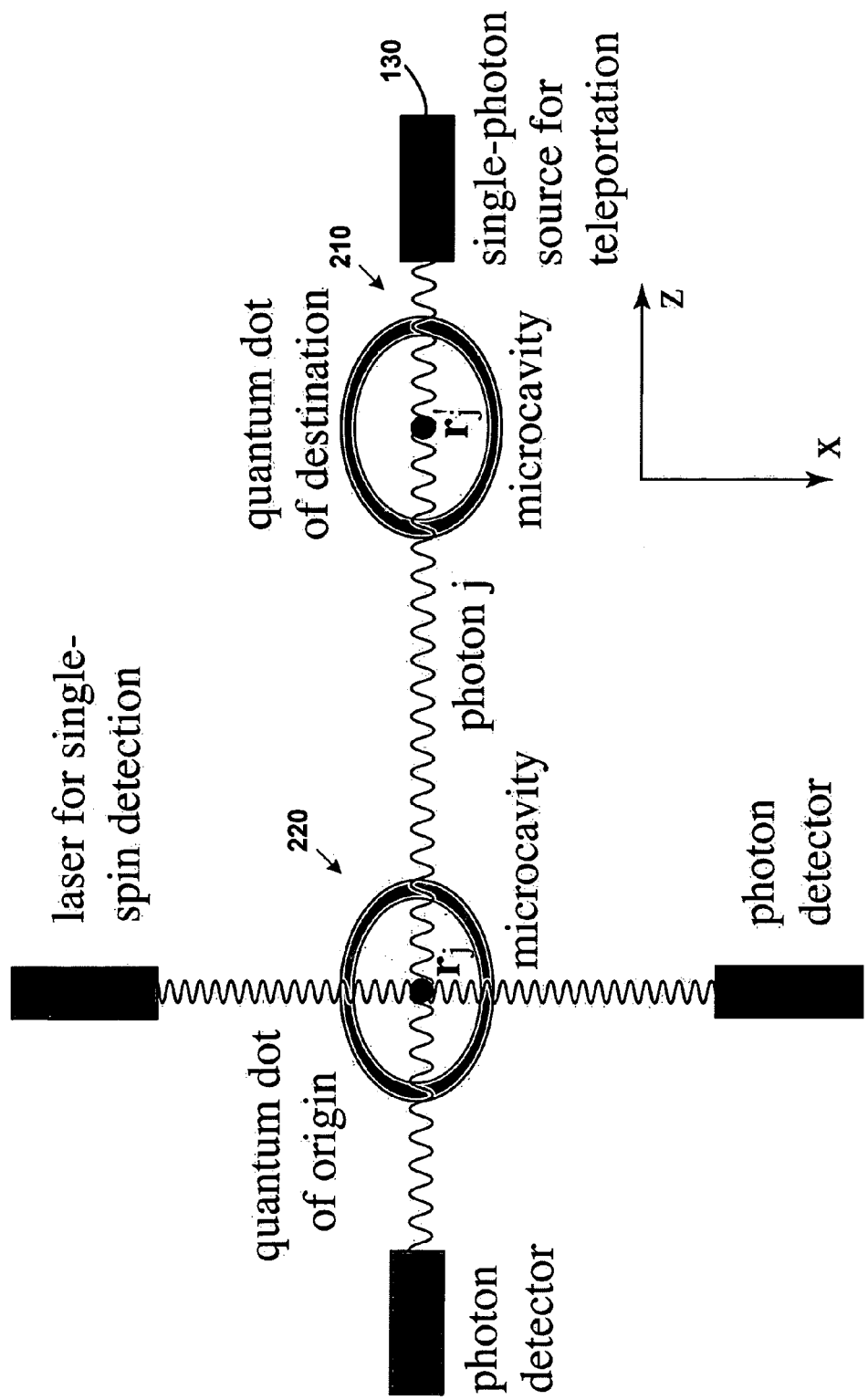
FIG. 2 is a block diagram illustrating the teleportation of a spin state from the quantum dot systems of FIG. 1.

Turning now to FIG. 2, this block diagram 100 illustrates the teleportation of the electron spin state from one of the quantum dots in system 110 to its corresponding quantum dot electron in system 120. Teleporting the many-qubit states in the quantum dot system 110 can be considered as the independent teleportation of each spin state from $r_j$ in quantum dot system 110 to $r_j'$ in quantum dot system 120. Therefore, the teleportation described with reference to FIG. 2 can apply to any of the qubit states, or quantum dots (e.g., quantum dot 112) described with reference to FIG. 1.

In the block diagram 100, the quantum dot $r_j'$ and the quantum dot $r_j$ are each embedded in an optical microcavity. An optical microcavity is a structure formed by reflecting faces on the two sides of an optical medium, such that a standing wave is formed having a wavelength associated with the thickness of the optical medium. The microcavity 210 is associated with the quantum dot $r_j'$ and the microcavity 220 is associated with the quantum dot $r_j$. These microcavities can be formed by growing layered structures such as Indium Gallium Arsenide, Gallium Arsenide, or some other suitable layered structure of light confinement. After the layered structure is grown, the microcavity is formed by etching mesas, or "whispering galleries" into the layered structures. For a high quality factor, a silicon microcavity can be plasma treated to form a highly reflecting silicon dioxide layer. The microcavities 210, 220 have different lengths in the z-direction and the x-direction, so that a scattered photon cannot change its direction.

The photon source 130 initiates the teleportation process by emitting a single photon j that travels in the -z-direction. This photon can have a wavelength of 1.55 microns, 800 nanometers, or some other suitable wavelength. In addition, the photon j can be polarized in the x-direction and enter the microcavity 210 that contains the quantum dot $r_j'$. The quantum dot $r_j'$ is initialized parallel to x. Before the photon j interacts with the quantum dot $r_j'$, the initial wave function describing both the photon and the spin associated with dot $r_j'$ is $|\Psi_{pe'}^{(1)}(0)\rangle = |\leftrightarrow\rangle|\leftarrow'\rangle$, which is a product state, meaning that the photon and electron spin are not "entangled". After this photon interacts with the quantum dot $r_j'$, the resulting spin wave function is $|\Psi_{pe'}^{(1)}(T)\rangle = e^{iS_0^{hh}}|\Psi_{hh}^{(1)}\rangle + e^{iS_0^{lh}}|\Psi_{lh}^{(1)}\rangle$, where $$|\psi_{hh}^{(1)}\rangle = \frac{(|\sigma_{(z)}^+\rangle|\uparrow'\rangle + |\sigma_{(z)}^-\rangle|\downarrow'\rangle)}{2}$$

and $$|\psi_{lh}^{(1)}\rangle = \frac{(|\sigma_{(z)}^-\rangle|\uparrow'\rangle + |\sigma_{(z)}^+\rangle|\downarrow'\rangle)}{2}.$$

Figure 3:
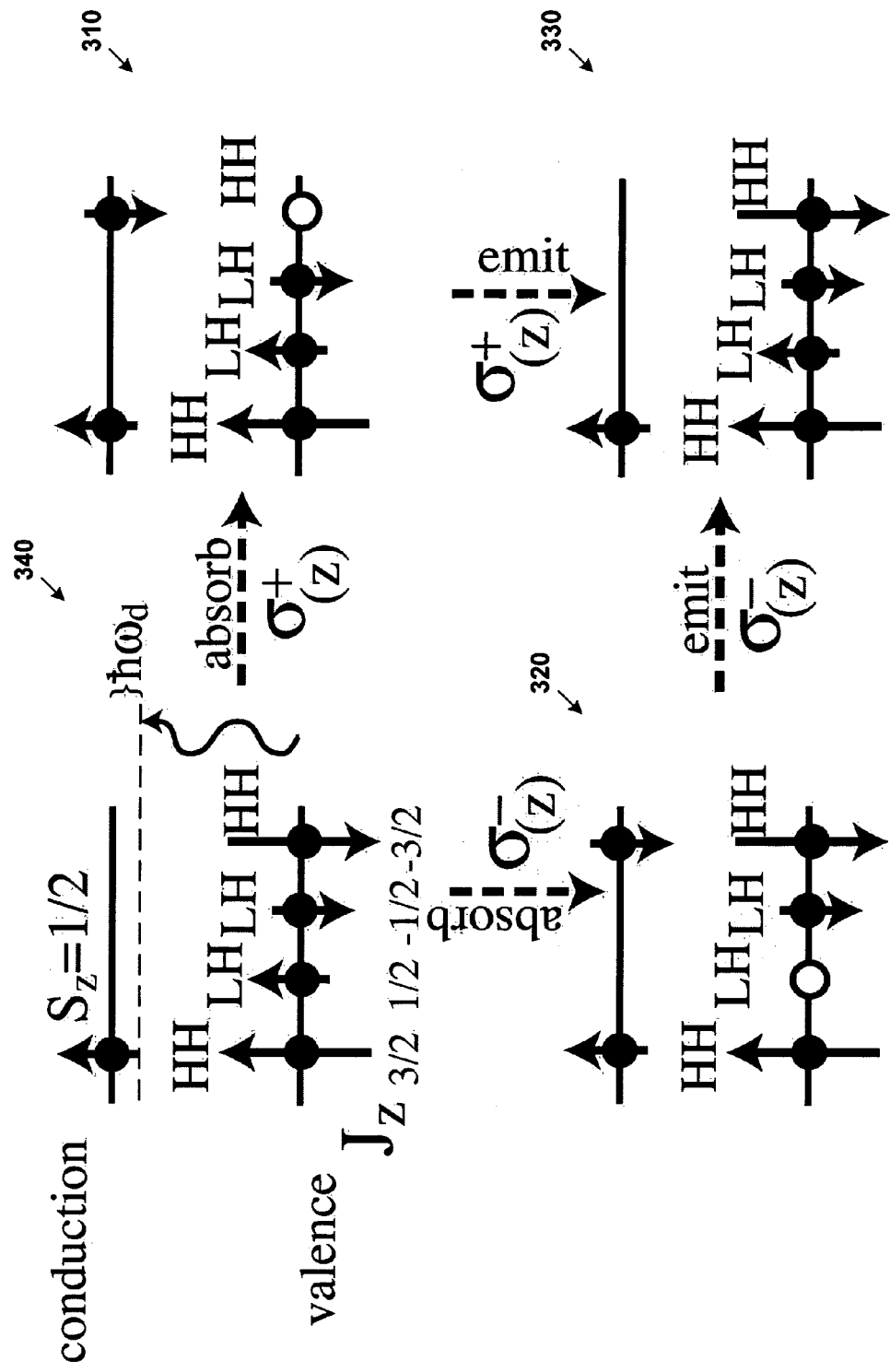
FIG. 3 is an diagram of the electronic states of the quantum dot illustrating possible virtual processes excited by the photon j of FIG. 1.

The interaction of the photon with the spin can occur through one of two possible pathways, as indicated on FIG. 3. The photon can virtually excite an electron-light-hole pair (going from 340 to 320), or an electron-heavy-hole pair (going from 340 to 310). The full quantum-mechanical state is a linear superposition of these two potential pathways. The wavefunction labeled "hh" is for the heavy-hole pathway, that labeled "lh" is for the light-hole pathway. Whichever pair is virtually excited the system will return to configuration 330, which is the same as its original configuration 340.

After the photon j interacts with the spin in the quantum dot $r_j'$, the photon travels to microcavity 220 containing the quantum dot $r_j$. This quantum dot $r_j$ can have one excess electron in a general single-spin state $|\Psi_e^{(1)}\rangle = \alpha|\uparrow\rangle + \beta|\downarrow\rangle$, where the quantization axis is the z-axis. Now this photon can facilitate teleportation from microcavity 220 to microcavity 210 until the spin in the quantum dot at microcavity 220 decoheres. Decoherence is the process whereby the quantum state of a system becomes unrelated to its past state, principally through interaction with other quantum mechanical entities such as nuclei, other electrons, or phonons. When the photon j interacts with the quantum dot $r_j$, this photon can teleport the spin associated with this quantum state to the microcavity 210 associated with the quantum dot $r_j'$. After the photon j interacts with the quantum dot $r_j$, the linear polarization of the photon j and the spin in quantum dot $r_j$ are measured. With these two measurements and a phase correction, it is possible to reconstruct the original spin state of quantum dot $r_j$ at quantum dot $r_j'$.

Quantitative Description

Copying information in a classical, or typical, system is quite different than copying information in a quantum system. Specifically, the information contained in a quantum two-level system cannot be completely copied because of underlying physical phenomenon described by the no-cloning theorem. While copying is not possible, there is a mechanism for transferring quantum information without transferring the object itself containing the quantum information. For a quantum information processor, the operation that can partially replace copying is the ability to transfer quantum information from one system to another. When the transfer is separated into a channel of classical information (e.g., a telephone wire, fiber-optic cable, or other commonly used method of communicating "0"'s and "1"'s) and one of Einstein-Podolsky-Rosen (EPR) correlations (i.e., the distribution of entangled particles between origin and destination) it is called "quantum teleportation."

Quantum teleportation can be performed with photons. A single photon state, (i.e., left or right circular polarization of the photon) can be teleported with the aid of an entangled photon pair. Normally, quantum teleportation of a single photonic qubit involves generating one maximally-entangled two-photon pair, a two-photon entangled measurement of one member of this pair, and measurement of the original photonic qubit. A qubit, or quantum bit, is a unit of quantum information that is the quantum mechanical version of the classical bit.

As mentioned above, the photon source 130 initiates the teleportation process by emitting a single photon j that travels in the −z-direction and is initially linearly polarized in the x direction, to the microcavity 210 that holds the destination quantum dot $r_j'$, whose spin is initialized parallel to x. Using the times $t_A < t_A + T < t_B < t_C < t_D$, where $t_A = 0$ can help distinguish what occurs during each step of teleportation. Before the photon j interacts with the quantum dot $r_j'$ (i.e., t=0), the initial spin wave function associated with dot $r_j'$ is $|\Psi_{pe'}^{(1)}(0)\rangle = |\leftrightarrow\rangle|\leftarrow'\rangle$.

Turning now to FIG. 3, this figure is a diagram of the electronic states of the quantum dot illustrating possible virtual processes excited by the photon j of FIG. 1. For an upward spin-↑, light with a polarization of $\sigma^+_{(z)}$ excites an electron and a heavy hole as shown at reference numeral 310. Light of polarization $\sigma^-_{(z)}$ for the same spin, excites an electron and a light hole (see reference numeral 320). In both cases the selection rules and Pauli blocking force the light subsequently emitted from electron-hole recombination to have the same polarization as was absorbed, and the final occupations of electron states in the dot, as shown at reference numeral 330, are the same as the initial occupations. These virtual processes have different probabilities, however, and this leads to Faraday rotation: a phase shift $e^{iS_o^{hh}}$ for light of polarization $\sigma^+_{(z)}$ and $e^{iS_o^{lh}}$ for light of polarization $\sigma^-_{(z)}$. In contrast, the phase shift is phase shift $e^{iS_o^{lh}}$ for light of polarization $\sigma^+_{(z)}$ and $e^{iS_o^{hh}}$ for light of polarization $\sigma^-_{(z)}$ for a downward spin-↓. Thus there is a conditional Faraday rotation of the components of the electron-photon state depending on the photon polarization and spin orientation.

After photon j interacts with the quantum dot $r_j'$, the resulting spin wave function is $|\Psi_{pe'}^{(1)}(T)\rangle = e^{iS_o^{hh}}|\Psi_{hh}^{(1)}\rangle + e^{iS_o^{lh}}|\Psi_{lh}^{(1)}\rangle$, where $$|\psi_{hh}^{(1)}\rangle = \frac{(|\sigma^+_{(z)}\rangle|\uparrow'\rangle + |\sigma^-_{(z)}\rangle|\downarrow'\rangle)}{2}$$

originates from the virtual process where a photon creates an electron and a heavy hole. The term $$|\psi_{lh}^{(1)}\rangle = \frac{(|\sigma^-_{(z)}\rangle|\uparrow'\rangle + |\sigma^+_{(z)}\rangle|\downarrow'\rangle)}{2}$$

originates from the virtual process where the photon creates an electron and a light hole. Both $|\Psi_{hh}^{(1)}\rangle$ and $|\Psi_{lh}^{(1)}\rangle$ are EPR states (maximally-entangled states). A photon state $|\Psi\rangle$ can be written as $$|\varphi\rangle = \frac{e^{-i\varphi}|\sigma^+_{(z)}\rangle + e^{i\varphi}|\sigma^-_{(z)}\rangle}{\sqrt{2}}$$

with a linear polarization rotated by z-axis with respect to the state $|\leftrightarrow\rangle$ of linear polarization in the x direction. Consequently, $$\langle \psi_{pe'}^{(1)}(T)\rangle = \frac{e^{i\frac{S_0^{hh}+S_0^{lh}}{2}}}{\sqrt{2}}\left(\left|\frac{-S_0}{2}\right\rangle|\uparrow'\rangle + \left|\frac{+S_0}{2}\right\rangle|\downarrow'\rangle\right)$$

where $S_0 = S_0^{hh} - S_0^{lh}$. Thus, the spin-photon interaction produces a conditional single-photon Faraday rotation around the z-axis by the angle $\pm S_0/2$. If $S_0 = \pi/2$, the linear polarization of the incoming photon is rotated $-\pi/4$ by the spin up component, and at the same time is rotated $+\pi/4$ by the spin down component, yielding two orthogonal photon polarizations. Thus, $|\Psi^{(1)}_{pe'}(T)\rangle = |\nwarrow\rangle|\uparrow'\rangle + |\nearrow\rangle|\downarrow'\rangle/\sqrt{2}$, which is maximally entangled. A maximally entangled state of two or more particles, when each particle has two orthogonal quantum mechanical states, corresponds to a many-particle state composed of the sum of two terms (A and B), in which both A and B are the product of one single particle wave function for each of the particles in the many-particle state, and each single-particle wave function for a given particle that appears in A is orthogonal to the single-particle wave function for the same particle in B. In order to enhance the spin-photon interaction sufficiently to achieve $S_0 = \pi/2$, which yields maximally entangled states, each quantum dot is placed in its own microcavity (as described in FIG. 1). Using a switchable cavity, as described below, permits the precise control of the Faraday rotation angle $S_0/2$ necessary for high fidelity teleportation. After interacting with the spin in the quantum dot system 120, the photon is sent to quantum dot system 110, and can be retained as a resource for teleportation from quantum dot system 110 to quantum dot system 120 until the spin at quantum dot system 110 decoheres. For coherence times of 100 ns, the maximum teleportation distance (determined by the speed of light) can be ~15 m; and for 10 ms, it is $1.5 \times 10^6$ m.

When it is time to teleport a spin in a quantum dot (e.g. 111) part of quantum dot system 110 to another dot (e.g. 121) part of quantum dot system 120 we let the photon interact with the quantum dot in the microcavity 220, giving rise to a GHZ state in the hybrid spin-photon-spin system. A GHZ state is a maximally-entangled state of 3 particles. The quantum dot 111 can have one excess electron in a general single-spin state $|\Psi_e^{(1)}\rangle = \alpha|\uparrow\rangle + \beta|\downarrow\rangle$, where the quantization axis is the z-axis. After this interaction, the equation that results is $$|\psi_{epe'}^{(1)}(t_C)\rangle = \frac{e^{i\frac{S_0^{hh}+S_0^{lh}}{2}}}{\sqrt{2}}(\alpha|\uparrow\rangle|-S_0/2 - \pi/4\rangle|\uparrow'\rangle \quad (1)$$
$$+ \alpha|\uparrow\rangle|-S_0/2 + \pi/4\rangle|\downarrow'\rangle$$

-continued $$+ \beta|\uparrow\rangle|+S_0/2-\pi/4\rangle|\uparrow'\rangle$$
$$+ \beta|\uparrow\rangle|+S_0/2+\pi/4\rangle|\downarrow'\rangle$$

When $S_0=\pi/2$, $|\Psi^{(1)}_{epe'}(t_C)\rangle$ can be rewritten and the equation that results is:

$$|\psi^{(1)}_{epe'}(t_C)\rangle = \frac{1}{\sqrt{2}}[|\updownarrow\rangle(-\alpha|\uparrow\rangle|\uparrow'\rangle + \beta|\downarrow\rangle|\downarrow'\rangle) + |\leftrightarrow\rangle(\alpha|\uparrow\rangle|\downarrow'\rangle + \beta|\downarrow\rangle|\uparrow'\rangle)] \quad (2)$$

which results in $$|\psi^{(1)}_{epe'}(t_C)\rangle = \frac{1}{\sqrt{2}}\left[\left(|\updownarrow\rangle|\leftarrow\rangle(-\alpha|\uparrow'\rangle+\beta|\downarrow'\rangle) + |\rightarrow\rangle(-\alpha|\downarrow'\rangle-\beta|\downarrow'\rangle)\right) + \frac{1}{\sqrt{2}}|\leftrightarrow\rangle[|\leftarrow\rangle\beta|\uparrow'\rangle+\alpha|\downarrow'\rangle) + |\rightarrow\rangle\beta|\uparrow'\rangle-\alpha|\downarrow'\rangle)\right] \quad (3)$$

in the $S_x$ representation for the spin at the origin (110).

If the linear polarization of the photon is measured first, then depending on the two initial spin orientations [see Equation 2], collapse of the wave function leaves the qubits at the quantum dot system 110 and at quantum dot system 120 in one of the four Bell states. After performing a single-spin measurement in the x direction of the spin in one of the quantum dots (e.g. 111) of the quantum dot system 110 (which, as described below, can be done with a single photon), the spin state of the corresponding dot (e.g. 121) in the quantum dot system 120 is projected onto (see previously described Equation 3) $|\Psi^{(1)}_{e1}(t_D)\rangle=-\alpha|\uparrow'\rangle+\beta|\downarrow'\rangle$, $|\Psi^{(1)}_{e2}(t_D)\rangle=-\alpha|\uparrow'\rangle-\beta|\downarrow'\rangle$, $|\Psi^{(1)}_{e3}(t_D)\rangle=\beta|\uparrow'\rangle+\alpha|\downarrow'\rangle$, $|\Psi^{(1)}_{e4}(t_D)\rangle=\beta|\uparrow'\rangle-\alpha|\downarrow'\rangle$ with equal probability. Thus if nothing further is done there is a 75% chance of error in the teleportation process, for three of the four states are not the same as the initial state. After communicating classically (i.e., with two bits) the outcome of the measurement of the linear polarization of the photon and quantum dot's 111 spin orientation along $S_x$ to the destination quantum dots 120, it is known which of the four states has been produced at quantum dot 121, and the original spin state of quantum dot 111 can be reconstructed at quantum dot 121, completing the teleportation. This teleportation system enables teleportation by using a single photon without an intermediate electronic qubit.

Expansion to a Many Qubit Teleportation System

As previously described with reference to FIG. 1, the teleportation system 100 is a many qubit teleportation system because the quantum dot system 100 includes many quantum states numbered 111-117. Similarly, the quantum dot system 120 also includes many quantum states numbered 121-127. Because the quantitative description above referred to a single qubit within the quantum dot system 110, a single quantum qubit within the quantum dot system 120, and a single photon, this description corresponded to a single qubit teleportation system, such as the single bit system 105. However, the previous quantitative description is equally applicable to the many-qubit teleportation system 100.

The approach for two or more dots closely resembles that of one dot. The teleportation can still be performed bit-by-bit, so long as photon j (j=1,2,3, . . . ) coming from the dot at $r_j'$ of quantum dot system 120 travels to the dot at $r_j$ of quantum dot system 110, as described with reference to FIGS. 1-2. Teleportation is mediated by photons that scatter independently off the dots and the conditional phase shifts from each spin can be treated independently. This approach provides a method of teleporting a many-qubit state of an arbitrary number of qubits, always relying on single-photon measurements.

Faraday rotation to entangle the photon and electron spin provides one of the possible ways to measure the spin with a single photon, which is described with reference to the following equation:

$$|\Psi^{(1)}_{pe'}(T)\rangle = e^{iS_0^{hh}}|\Psi_{hh}^{(1)}\rangle + e^{iS_0^{lh}}|\Psi_{lh}^{(1)}\rangle \quad (4)$$

where $$|\psi^{(1)}_{hh}\rangle = \frac{(|\sigma^+_{(z)}\rangle|\uparrow'\rangle + |\sigma^-_{(z)}\rangle|\downarrow'\rangle)}{2}$$

and $$|\psi^{(1)}_{lh}\rangle = \frac{(|\sigma^-_{(z)}\rangle|\uparrow'\rangle + |\sigma^+_{(z)}\rangle|\downarrow'\rangle)}{2}.$$

It is assumed that the microcavities have an additional resonant mode at a different frequency for photons propagating in the x direction. Equation 4 shows that if the spin on the quantum dot points in the +x (−x) direction, this incoming photon is converted into an outgoing circularly polarized photon $\sigma_{(x)}^+$ ($\sigma_{(x)}^-$). Measuring the circular polarization of the photon j after it escapes yields the spin orientation along x. It is possible for high fidelity because time-correlated single photon counting permits a counting efficiency close to one. In an alternative embodiment, the electrical single-spin measurements at quantum dot system 110 can be accomplished with a single electron transistor (SET), by converting the spin information to charge information.

The spin-selective coupling between the electron spins and the photons, which leads to their mutual entanglement (and eventually to teleportation), is enhanced by surrounding each of the dots by a unique high-Q microcavity (see FIG. 2). Each microcavity has a single well-defined left-circularly polarized photon mode (and a right-circularly polarized photon mode of identical frequency) nearly resonant with the fundamental optical transition of the quantum dot. By relying on non-resonant interaction of photons both in the z-direction and the x-direction, the four highest-energy valence states are nearly degenerate, which corresponds to nearly spherical dots of zincblende or wurtzite material. Nearly degenerate means that energy difference of these four states are much smaller than the detuning energy $\hbar\omega_d$. Then, in both the z-direction and the x-direction, there is a conditional Faraday rotation depending on the spin state of the excess electron on the dot.

The Faraday rotation from the virtual process in which a photon creates an electron and heavy hole is three times larger than that from the virtual process in which a photon creates an electron and light hole, and is in the opposite direction. The transition matrix elements for exciting an electron and heavy hole ($V_{hh}$) or an electron and light hole ($V_{lh}$) are calculated from the electron-photon interaction Hamiltonian eA·p/2mc, where p is the momentum of an electron and A is the vector potential of the electromagnetic field. The full Hamiltonian in the rotating frame reads then $$H = \begin{pmatrix} E_c - \hbar\varpi_d & V_{hh} & 0 & 0 \\ V_{hh} & E_c & 0 & 0 \\ 0 & 0 & E_c - \hbar\varpi_d & V_{lh} \\ 0 & 0 & V_{lh} & E_c \end{pmatrix} \quad (5)$$

where $E_c$ is the energy of the excess electron. The basis states are $\{|\uparrow\rangle|\sigma_{(z)}^+\rangle; |\uparrow\downarrow,hh\rangle; |\uparrow\rangle|\sigma_{(z)}^-\rangle|\uparrow\downarrow,lh\rangle\}$; the states $|\uparrow\downarrow,hh\rangle$ and $|\uparrow\downarrow,lh\rangle$ are shown schematically in FIG. 3. The Hamiltonian for the spin down is similar. The rates of Faraday rotation for these virtual transitions are $\Omega_{hh} = V_{hh}^2/\hbar^2\omega_d = 3V_{lh}^2/\hbar^2\omega_d$ and $\Omega_{lh} = V_{lh}^2/\hbar^2\omega_d$. Thus the phase shift accumulated by the photon state during the photon's residence time T in the microcavity is given by $S_0^{hh} = \Omega_{hh}T$ and $S_0^{lh} = \Omega_{lh}T$ for heavy and light holes, respectively. The total phase shift is governed by the following equation $S_0 = S_0^{hh} - S_0^{lh} = (\Omega_{hh} - \Omega_{lh})T = \Omega_0 T$. If $S_0 = \pi/2$ (modulo $2\pi$), the photon and electron spin become maximally entangled.

Having an interaction strength between the photon and the quantum dot transition to be weak (i.e. $V_{hh}, V_{lh} \ll \hbar\omega_d$) creates certain consequences. The frequency of the photon is tuned below the band gap $E_{gap}$, which leads to non-resonant interaction. Values for the band gap can be $E_{gap}$=1 eV, 3 eV, or some other suitable value. The level broadening can be $\Gamma$=10 μeV, 15 μeV, or some other suitable value. An interaction time between the photon and the electron spin can approximately T=1 ns, 2 ns, or some other suitable time that is much smaller than the limiting spin decoherence time in semiconductor nanostructures. For an interaction time T=1 ns, the bandwidth that results $\Gamma_{photon}$=0.7 μeV. If the size of the microcavity is 3.5 μm³, $V_{hh}$ is typically 50 μeV. Thus for a reasonable choice $\hbar\omega_d \approx 1.5$ meV $\gg \Gamma, \Gamma_{photon}$, the scattering frequency can be adjusted to $$\Omega_0 = \frac{\pi}{2} \times 10^9 s^{-1},$$

and consequently $S_0 = \pi/2$.

To control the interaction time T precisely, the microcavity can be actively Q-switched with an electro-optic modulator. Response times for these types of modulators can be less than 1 ps. With this response time, it leads to a phase error on the order of 1 ps/1 ns=0.1%. In contrast, the Q-factor can be as high as Q=1.25×10⁸, which is equivalent to a photon lifetime of $\tau$=43 ns. Although this Q was achieved for a 10⁵ μm³ cavity, the same processing can be applied to 3.5 μm³ cavities. The theoretical limit on the Q value of a cavity of this size is Q~10¹³. Insertion of a spherical (colloidal) quantum dot (as part of a 2-quantum dot system or a system with more quantum dots) into a photonic crystal with holes can be the simplest method of incorporating quantum dots controllably into a high-Q microcavity. After T=1 ns in the small cavity, before Q-switching, the escape probability is $1-e^{-T/\tau}$=2%. Thus, the entangled state can be produced with high fidelity. This 2% estimate also applies to the fidelity of the single-shot photon measurements of the electron spin orientation. Transmission into or out of the cavity has a fidelity much greater than 99% fidelity because commercial highly transmissive coatings have reflectivities $\ll 0.1\%$. Hence, the total fidelity of the teleportation can exceed 97%.

The many qubit teleportation system 100 can also provide a general link between spintronic quantum information devices and photonic quantum information devices. Letting the photon interact only with the spin at quantum dot system 110 gives the possibility to transfer a $|\Psi(0)\rangle$ onto the photon state, and back (i.e., this provides a way of transferring quantum information from an electron spin in a quantum dot to a photon, or from a photon to an electron spin in a quantum dot). An example of a general class of opto-spintronic quantum information devices relying on this ability includes a Quantum Dynamic RAM (QDRAM) memory. In other words, the teleportation system 100 can be used in implementing QDRAM. For this type of memory device, the many-spin state can be transferred to the many-photon state and back. As the decoherence time of photons is much longer than the decoherence time of the spins of electrons, it is useful to keep the quantum information encoded as photons between error-correcting operations acting on the electron spins. Thus, the refresh time can be much longer than the decoherence time of the electrons. This can enhance the maximum distance possible for teleportation beyond that determined from the electron spin coherence time. With the teleportation system 100 that enables efficient transfer of quantum information between spintronic and photonic systems, many other such devices can be imagined which can also exploit the complementary advantages of spintronic and photonic quantum information processing.

The particular embodiments disclosed above are illustrative only, as the teleportation system 100 can be modified and practiced in different, but equivalent, manners apparent to those skilled in the art having the benefit of the teachings herein. Furthermore, no limitations are intended to the details of construction or design herein shown, other than as described in the claims below. It is, therefore, evident that the particular embodiments disclosed above may be modified and all such variations are considered within the scope and spirit of this invention. Accordingly, the protection sought herein is set forth in the claims below.

The invention claimed is:

1. A method for creating a logic state, the method comprising the steps of:
   receiving a photon with a first initial polarization; and
   interacting the photon with a first semiconductor crystal having a first spin orientation, wherein said interaction produces a first resulting polarization of said photon dependent upon the first spin orientation of said first semiconductor crystal, wherein interacting the photon with the first semiconductor crystal generates a maximally entangled state.

2. The method of claim 1, further comprising the steps of:
   measuring the first resulting polarization of said photon; and
   determining an original spin orientation associated with the first semiconductor crystal in response to the measured first resulting polarization.

3. The method of claim 2, further comprising the step of using the measured resulting polarization and a measured spin polarization for correcting potential errors associated with teleportation.

4. The method of claim 1, further comprising the steps of:
   interacting the photon with a second semiconductor crystal having a second spin orientation, wherein said interaction produces a second resulting polarization of said photon dependent upon the second spin orientation associated with the second semiconductor crystal; and defining a logic state using the second resulting polarization, the first spin orientation, and the second spin orientation.

5. The method of claim 4, further comprising the steps of:
causing the first spin orientation to have a definite initial orientation;
measuring the second resulting polarization;
receiving a second photon with a second initial polarization propagating in a direction different from the first photon;
interacting the second photon with the second semiconductor crystal for producing a third resulting polarization dependent upon the second spin orientation associated with the second semiconductor crystal;
measuring the third resulting polarization; and
determining the spin orientation associated with the second semiconductor crystal after interaction with the first photon, but before interacting with the second photon, in response to measuring the third resulting polarization.

6. The method of claim 5, further comprising the step of using the measured second and third resulting polarizations for correcting potential errors associated with teleportation.

* * * * *

UNITED STATES PATENT AND TRADEMARK OFFICE
CERTIFICATE OF CORRECTION

PATENT NO. : 7,667,995 B1  Page 1 of 1
APPLICATION NO. : 11/352387
DATED : February 23, 2010
INVENTOR(S) : Michael N. Leuenberger, Michael E. Flatté and David D. Awschalom It is certified that error appears in the above-identified patent and that said Letters Patent is hereby corrected as shown below:

In column 1, line 3; insert the following paragraph before "CROSS REFERENCE TO RELATED APPLICATIONS":

--GOVERNMENT SUPPORT CLAUSE

This invention was made with government support under Grant No. DAAD 19-01-1-0490 awarded by the Defense Advanced Research Agency/Army Research Office, Grant No. N00014-04-1-0457 awarded by the Defense Advanced Research Agency/Office of Naval Research SPINS and Grant No. DMR-0305223 awarded by the National Science Foundation. The government has certain rights in the invention.--

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,667,995 B1  Page 1 of 1
APPLICATION NO. : 11/352387
DATED : February 23, 2010
INVENTOR(S) : Leuenberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this

Seventh Day of December, 2010

David J. Kappos
*Director of the United States Patent and Trademark Office*